US012101769B2

(12) United States Patent
Yukawa

(10) Patent No.: US 12,101,769 B2
(45) Date of Patent: Sep. 24, 2024

(54) COMMUNICATION APPARATUS, WIRELESS COMMUNICATION SYSTEM, AND METHOD FOR CONTROLLING ACCESS POINT

(71) Applicant: CANON KABUSHIKI KAISHA, Tokyo (JP)

(72) Inventor: Mitsuyoshi Yukawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 17/508,722

(22) Filed: Oct. 22, 2021

(65) Prior Publication Data

US 2022/0124770 A1 Apr. 21, 2022

Related U.S. Application Data

(63) Continuation of application No. PCT/JP2020/008717, filed on Mar. 2, 2020.

(30) Foreign Application Priority Data

Apr. 25, 2019 (JP) ................................ 2019-084435

(51) Int. Cl.
*H04W 72/12* (2023.01)
*H04W 72/20* (2023.01)
*H04W 84/18* (2009.01)

(52) U.S. Cl.
CPC ........... *H04W 72/20* (2023.01); *H04W 72/12* (2013.01); *H04W 84/18* (2013.01)

(58) Field of Classification Search
CPC ............................. H04W 72/12; H04W 72/18
USPC ....................................................... 370/329
See application file for complete search history.

(56) References Cited

U.S. PATENT DOCUMENTS 10,791,572 B2 9/2020 Umehara
2016/0295513 A1 10/2016 Moon et al.

FOREIGN PATENT DOCUMENTS

| CN | 107771376 A | 3/2018 |
|---|---|---|
| CN | 108029143 A | 5/2018 |
| CN | 109315013 A | 2/2019 |
| JP | 2018-050133 A | 3/2018 |
| WO | 2014074919 A1 | 5/2014 |
| WO | 2019023079 A2 | 1/2019 |

OTHER PUBLICATIONS

Ryu, Kiseon et al. Consideration on multi-AP coordination for EHT [online], IEEE 802. 11-18 / 1982r1 , Jan. 14, 2019. slides 2-9, [retrieved on May 19, 2020 ], Retrieved from the Internet:<URL:https://mentor.ieee.org/802.11/dcn/18/11-18-1982-01-0eht-consideration-on-multi-ap-coordination-foreht.pptx>.

(Continued)

*Primary Examiner* — Angel T Brockman
(74) *Attorney, Agent, or Firm* — CANON U.S.A., INC. IP Divsion

(57) ABSTRACT

A communication apparatus, which operates as a master access point in a wireless network including one or more other access points operating as slaves and one or more stations, generates a trigger frame that includes a Trigger type subfield value indicating an instruction to perform cooperative transmission with the other access points, transmits the generated trigger frame to the other access points, and executes the cooperative transmission with the other access points to which the trigger frame has been transmitted.

16 Claims, 5 Drawing Sheets

(56) References Cited

OTHER PUBLICATIONS

Patil, Abhishek et al., Resolution for CIDs in 9.3. 1.23 [online], IEEE 802. 11-18 / 0065r3, Jan. 16, 2018., section 9.3. 1.23, [retrieved on May 19, 2020], Retrieved from the Internet:<URL:https://mentor.ieee.org/802.11/dcn/18/11-18-0065-03-00ax-resolutions-to-cids-in-9-2-I-23-part-I.docx>.

Park, Sungj in et al., Multi-AP Transmission Procedure [online]' IEEE 802. 11-19 / 0448r1, Mar. 12, 2019., slides 2-18, [retrieved on May 19, 2020], Retrieved from the Internet:<URL:https://mentor.ieee.org/802.11/dcn/19/11-19-0448-01-0eht-multi-ap-transmission-procedure. PPtx>.

802 11 Working Group of the LAN/MAN Standards Committee of the IEEE Computer Society; "Draft Standard for Information technology—Tele-communications and information exchang between systems Local and metropolitan area networks—Specific requirements, Part 11: Wireless LAN Medium Access Control (MAC) and Physical Layer (PHY) Specification, Amendment 1: Enhancements for High Efficiency WLAN", IEEE Draft; Draft P802.11AX_D3.3, IEEE-SA, XP068137598, vol. 802.11ax drafts, No. D3.3 Dec. 18, 2018, pp. 1-730, (Retrieved from the Internet: URL:www.ieee802.org/11/private/Draft_Sndards/11ax/DraftsP802.11az_p3.3.pdf).

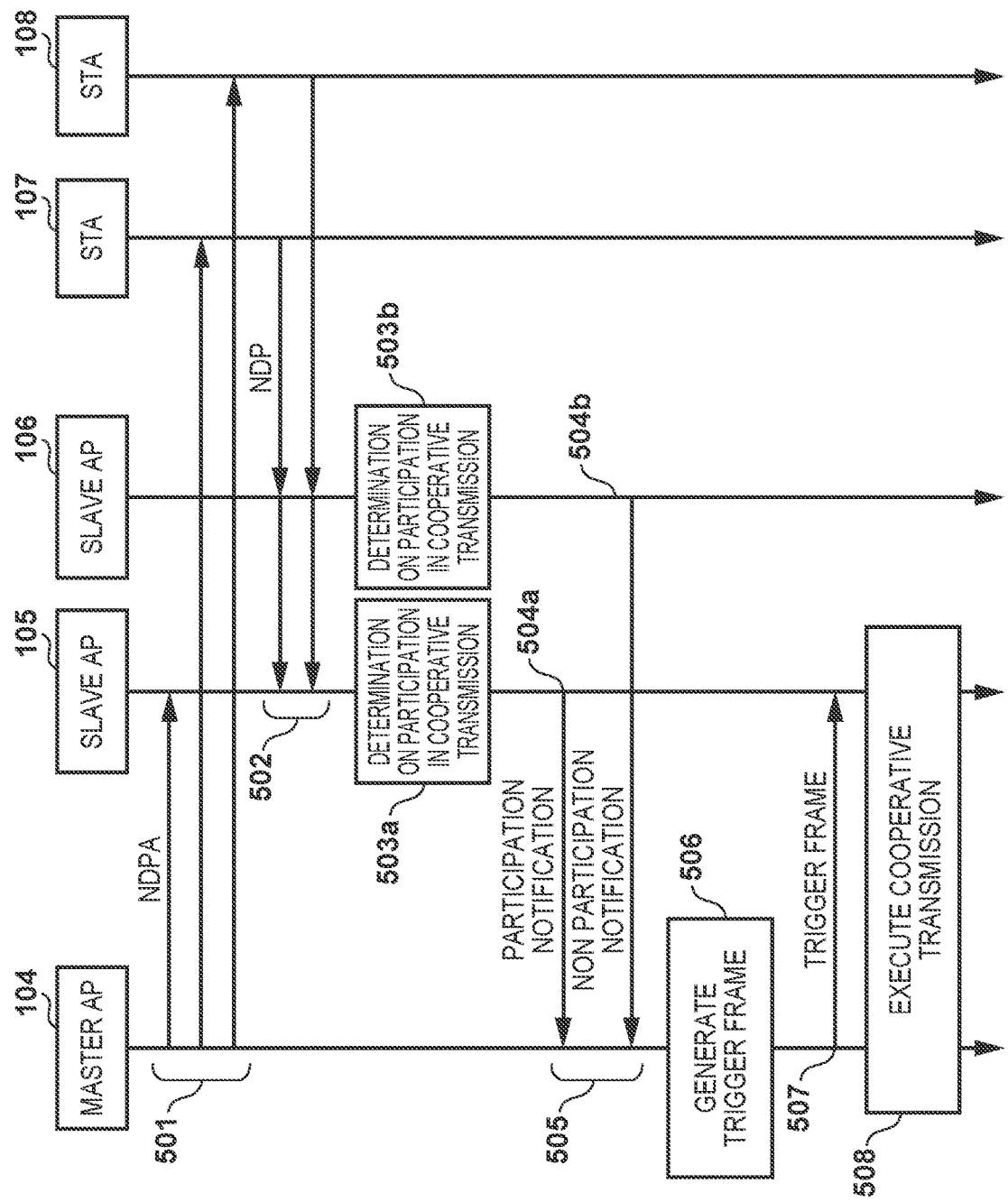

COMMUNICATION APPARATUS, WIRELESS COMMUNICATION SYSTEM, AND METHOD FOR CONTROLLING ACCESS POINT

CROSS-REFERENCE TO RELATED APPLICATIONS

This application is a Continuation of International Patent Application No. PCT/JP2020/008717, filed Mar. 2, 2020, which claims the benefit of Japanese Patent Application No. 2019-084435, filed Apr. 25, 2019, both of which are hereby incorporated by reference herein in their entireties.

BACKGROUND OF THE INVENTION

Field of the Invention

The present invention relates to a communication apparatus, a wireless communication system, and a method for controlling an access point.

Background Art

In recent years, with the development of information and communication technology, the amount of Internet usage has been increasing year by year, and various communication technologies are being developed to meet the increasing demand. Wireless local area network (WLAN) technology, in particular, has achieved throughput improvements in Internet communications such as packet data, audio, and video using mobile terminal devices, and currently various technological developments are still being actively pursued.

In the development of WLAN technology, a number of standardization efforts by the Institute of Electrical and Electronics Engineers (IEEE) 802, which is a standardization organization for communication technologies, have played an important role. The IEEE802.11 standards are known as part of the standard WLAN communication standards, and include the IEEE802.11a/b/g/n/ac or IEEE802.11ax standards. For example, 802.11ax, which is the latest standard, uses OFDMA to achieve high peak throughput of up to 9.6 gigabits per second (Gbps) and improved communication speed under congested conditions (Patent Document 1). Note that OFDMA is an abbreviation for Orthogonal frequency-division multiple access.

In recent years, study of a successor standard aimed at further improving throughput and efficiency of frequency utilization is being conducted by a study group called IEEE802.11 EHT (extremely high throughput). In this study, a task group called IEEE802.11be was established. IEEE802.11be is studying a technology for cooperatively operating a plurality of access points (APs) to further improve throughput and efficiency of frequency utilization.

An example of the cooperative operation is distributed MIMO technology, which is based on a technology called multi-input multi-output (MIMO), where a plurality of transmitting and receiving antennas are used at the same time and on the same channel. In distributed MIMO, in an environment where there are a plurality of access points (hereafter APs) and a plurality of stations (hereafter STAs), information regarding the communication state and the state of each AP is shared between the plurality of APs, and data is sent from the APs to the STAs at the same time. As a result of the multiple APs thus synchronously transmitting data in cooperation, the number of spatial streams can be increased compared with the case of a single AP, and therefore, improved throughput can be expected.

Another example of the cooperative operation is a technology called cooperative beamforming. In cooperative beamforming, when an AP transmits data to an STA in a basic service set (BSS), an antenna pattern is used with which the antenna gain in the direction of the STA to which data is to be transmitted is large and the antenna gain in the directions of STAs in BSSes of other APs is low. Interference between BSSes can be reduced by setting and scheduling the antenna pattern the plurality of APs based on environmental information such as the position of each STA.

The aforementioned synchronous data transmission by a plurality of access points in cooperative operation and/or data transmission by means of cooperative beamforming is called cooperative transmission. In the aforementioned cooperative transmission by a plurality of APs, it is conceivable to classify the plurality of APs into one master AP that manages the other APs and slave APs that operate under the management of the master AP. For example, it is conceivable that cooperative transmission can be realized as a result of the master AP transmitting a trigger frame to the slave APs, based on the timings at which the trigger frame is received by the plurality of APs. However, there is no trigger frame format that is transmitted and received between APs in order that cooperative transmission is performed by a plurality of APs.

CITATION LIST

Patent Literature

PTL1: Japanese Patent Laid-Open No. 2018-050133

SUMMARY OF THE INVENTION

One embodiment of the present invention provides a technique with which a master access point notifies slave access points of information for cooperative transmission using a trigger frame.

According to one aspect of the present invention, there is provided a communication apparatus that operates as a master access point in a wireless network that includes one or more other access points operating as slaves and one or more stations, the apparatus comprising: a generating unit configured to generate a trigger frame that includes a Trigger type subfield value indicating an instruction to perform cooperative transmission with the other access points; a transmitting unit configured to transmit the trigger frame to the other access points; and an executing unit configured to execute the cooperative transmission with the other access points to which the trigger frame has been transmitted.

According to another aspect of the present invention, there is provided a communication apparatus that operates as a slave access point in a wireless network that includes another access point operating as a master and one or more stations, the apparatus comprising: a receiving unit configured to receive a trigger frame for giving an instruction to perform cooperative transmission with the other access point operating as the master, from the other access point; and an executing unit configured to execute cooperative transmission to the one or more stations with the other access point, based on the received trigger frame.

According to another aspect of the present invention, there is provided a wireless communication system in which a plurality of access points and one or more stations constitute a wireless network, wherein one access point out of the plurality of access points operates as a master, and another access point out of the plurality of access points operates as a slave, the system comprising: a generating unit configured to generate a trigger frame that includes a Trigger type subfield value indicating an instruction to perform cooperative transmission with the other access point; a transmitting unit configured to transmit the trigger frame from the access point operating as the master to the access point operating as the slave; and an executing unit configured to cause the access point operating as the master and the access point operating as the slave that has received the trigger frame to execute the cooperative transmission to the one or more stations.

According to another aspect of the present invention, there is provided an access point controlling method for controlling an access point that operates as a master and constitutes a wireless network that includes one or more other access points operating as slaves and one or more stations, the method comprising: generating a trigger frame that includes a Trigger type subfield value indicating an instruction to perform cooperative transmission with the other access points; transmitting the trigger frame to the other access points; and executing the cooperative transmission with the other access points to which the trigger frame has been transmitted.

According to another aspect of the present invention, there is provided an access point control method for controlling an access point that operates as a slave and constitutes a wireless network that includes another access point operating as a master and one or more stations, the method comprising: receiving a trigger frame for giving an instruction to perform cooperative transmission with the other access point operating as the master, from the other access point; and executing cooperative transmission to the one or more stations with the other access point, based on the received trigger frame.

According to another aspect of the present invention, there is provided a non-transitory computer-readable storage medium storing a program for causing a computer to perform an access point controlling method for controlling an access point that operates as a master and constitutes a wireless network that includes one or more other access points operating as slaves and one or more stations, the method comprising: generating a trigger frame that includes a Trigger type subfield value indicating an instruction to perform cooperative transmission with the other access points; transmitting the trigger frame to the other access points; and executing the cooperative transmission with the other access points to which the trigger frame has been transmitted.

According to another aspect of the present invention, there is provided a non-transitory computer-readable storage medium storing a program for causing a computer to perform an access point control method for controlling an access point that operates as a slave and constitutes a wireless network that includes another access point operating as a master and one or more stations, the method comprising: receiving a trigger frame for giving an instruction to perform cooperative transmission with the other access point operating as the master, from the other access point; and executing cooperative transmission to the one or more stations with the other access point, based on the received trigger frame.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 5 is a sequence diagram showing operations performed until cooperative transmission is executed in the wireless communication system according to the embodiment.

DESCRIPTION OF THE EMBODIMENTS

Figure 1:
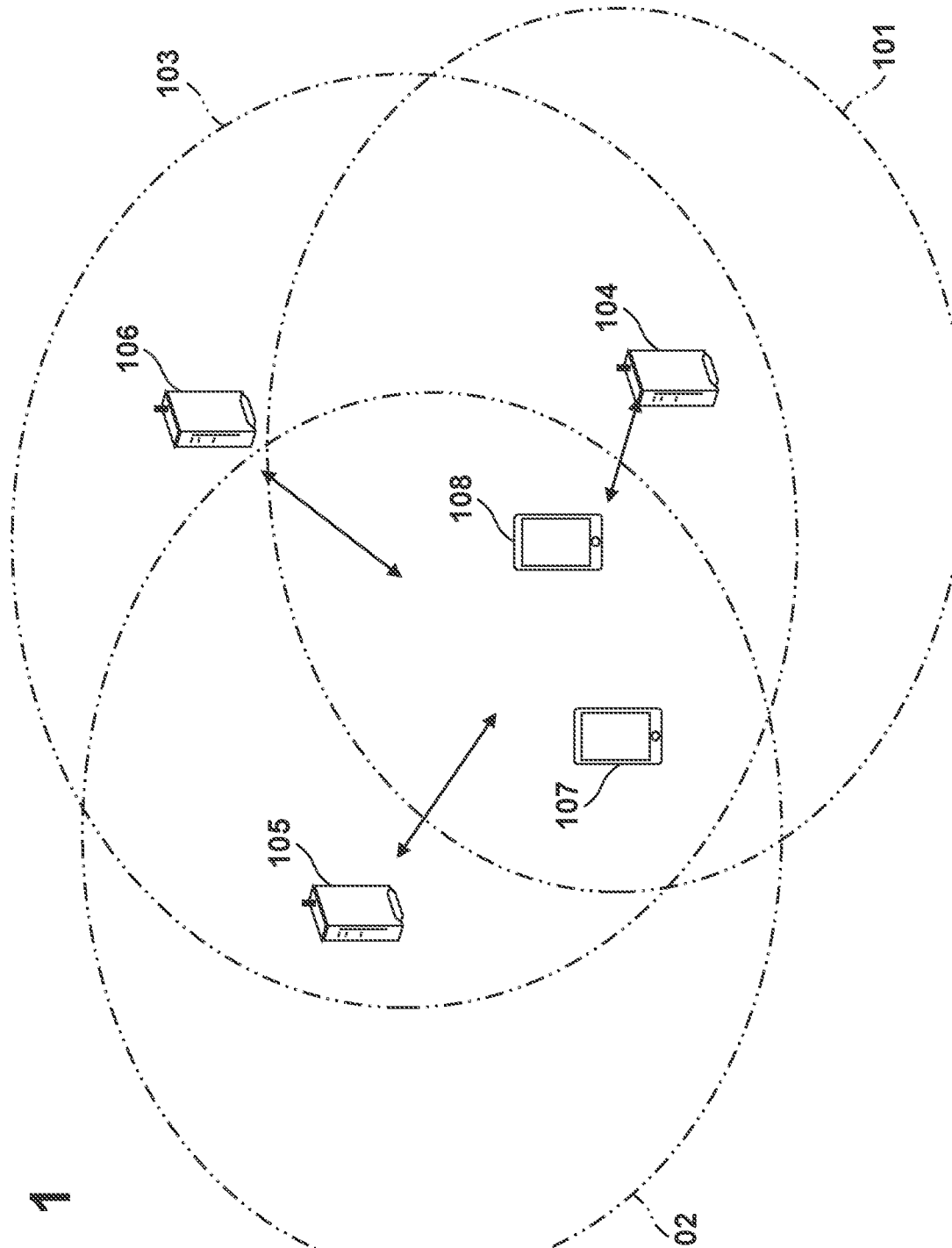
FIG. 1 is a diagram showing an example configuration of a wireless communication system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a diagram showing an example configuration of a network that a communication apparatus 104 according to the present embodiment joins. Communication apparatuses 107 and 108 are stations (STAs) that have a role of joining wireless networks 101, 102, and 103. The communication apparatus 104 is an access point (AP) that has a role of establishing the wireless network 101, a communication apparatus 105 is an AP that has a role of constructing the wireless network 102, and a communication apparatus 106 is an AP that has a role of constructing the wireless network 103. The communication apparatuses 104 to 106 can perform cooperative transmission. Note that in the present embodiment, the communication apparatus 104 functions as a master AP and can control the communication apparatuses 105 and 106, which are slave APs.

The communication apparatuses 104 to 108 support the IEEE802.11be standard, and can execute wireless communication conforming to the IEEE802.11be standard via the wireless networks 101, 102, and 103. Note that IEEE is an abbreviation for the Institute of Electrical and Electronics Engineers. The communication apparatuses 104 to 108 can communicate in frequency bands of the 2.4-GHz band, the 5-GHz band, and the 6-GHz band. The communication apparatuses 104 to 108 can also communicate using bandwidths of 20 MHz, 40 MHz, 80 MHz, 160 MHz, and 320 MHz.

The communication apparatuses 104 to 108 can realize multi-user (MU) communication in which signals of a plurality of users are multiplexed, by executing OFDMA communication conforming to the IEEE802.11be standard. OFDMA is an abbreviation for Orthogonal Frequency Division Multiple Access. In OFDMA communication, a portion (RU; Resource Unit) of a divided frequency band is assigned to each STA such that assigned RUs do not overlap, and carrier waves of the STAs are orthogonal. For this reason, the AP can communicate with the plurality of STAs in parallel.

Note that although it has been described that the communication apparatuses 104 to 108 support the IEEE802.11be standard, the communication apparatuses 104 to 108 may additionally support legacy standards which are standards prior to the IEEE802.11be standard. Specifically, the communication apparatuses 104 to 108 may support at least one of the IEEE 802.11a/b/g/n/ac/ax standards. In addition to the IEEE802.11 series standards, the communication apparatuses 104 to 108 may also support other communication standards such as Bluetooth (registered trademark), NFC, UWB, ZigBee, and MBOA. Note that UWB is an abbreviation for Ultra Wide Band, and MBOA is an abbreviation for Multi Band OFDM Alliance. NFC is an abbreviation for Near Field Communication. UWB includes wireless USB, wireless 1394, WiNET, and the like. The communication apparatuses 104 to 108 may also support standards of wired communication such as a wired LAN.

Specific examples of the communication apparatuses 104 to 106 include a wireless LAN router, a personal computer (PC), and the like, but are not limited thereto. The communication apparatuses 104 and 106 may alternatively be information processing apparatuses such as wireless chips capable of executing wireless communication conforming to the IEEE802.11be standard. Specific examples of the communication apparatuses 107 to 108 include cameras, tables, smartphones, PCs, mobile phones, video cameras, and the like, but are not limited thereto. The communication apparatuses 107 and 108 may alternatively be information processing apparatuses such as wireless chips capable of executing wireless communication conforming to the IEEE802.11be standard. The wireless network in FIG. 1 is constituted by three APs and two STAs, but the numbers of APs and STAs are not limited thereto.

Figure 2:
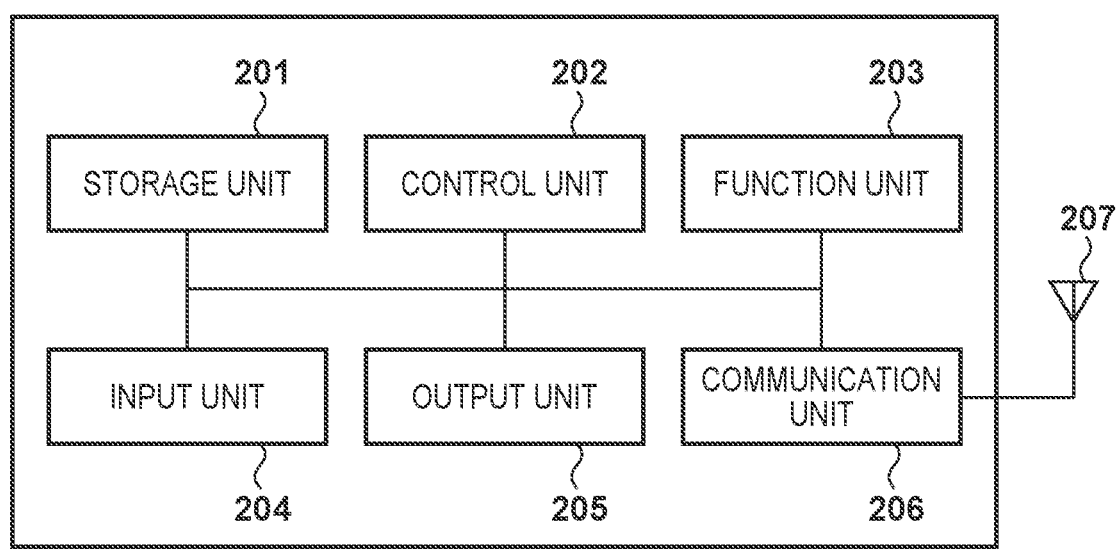
FIG. 2 is a diagram showing a hardware configuration of a communication apparatus according to the embodiment.

FIG. 2 shows an example hardware configuration of the communication apparatus 104 according to the present embodiment. The communication apparatus 104 includes a storage unit 201, a control unit 202, a function unit 203, an input unit 204, an output unit 205, a communication unit 206, and an antenna 207. Note that the communication apparatuses 105 and 106 also have the same hardware configuration as that of the communication apparatus 104.

The storage unit 201 is constituted by a memory such as a ROM or a RAM, and stores various kinds of information such as computer programs for performing various operations described later and communication parameters for wireless communication. ROM is an abbreviation for Read Only Memory, and RAM is an abbreviation for Random Access Memory. Note that, in addition to the memory such as a ROM or a RAM, a storage medium such as a flexible disk, a hard disk, an optical disk, a magneto-optical disk, a CD-ROM, a CD-R, a magnetic tape, a nonvolatile memory card, or a DVD may be used as the storage unit 201. Further, the storage unit 201 may include a plurality of memories or the like.

The control unit 202 is constituted by one or more processors such as a CPU or an MPU, and controls the entire communication apparatus 104 by executing the computer programs stored in the storage unit 201. CPU is an abbreviation for a central processing unit, and MPU is an abbreviation for a micro processing unit. Note that the control unit 202 may control the entire communication apparatus 104 in cooperation with the computer programs and an OS (Operating System) stored in the storage unit 201. The control unit 202 also generates data and signals to be transmitted in communication with other communication apparatuses. Further, the control unit 202 may include a plurality of processors such as a multi-core processor, and control the entire communication apparatus 104 using the plurality of processors. The control unit 202 also controls the function unit 203 to execute predetermined processing such as wireless communication, image capturing, printing, and projection. The function unit 203 is hardware for the communication apparatus 104 to execute predetermined processing.

The input unit 204 accepts various operations made from a user. The output unit 205 makes various outputs to the user via a monitor screen and/or a speaker. Here, the outputs made by the output unit 205 are not limited to a display on the monitor screen and audio output by the speaker, and may also be a vibration output or the like. Note that both the input unit 204 and the output unit 205 may be realized by one module, as with a touch panel. The input unit 204 and the output unit 205 may be integrated with the communication apparatus 104, or may be separate from the communication apparatus 104.

The communication unit 206 controls wireless communication conforming to the IEEE802.11be standard. The communication unit 206 may also control wireless communication conforming to other IEEE802.11 series standards in addition to the IEEE802.11be standard, and may control wired communication using a wired LAN or the like. The communication unit 206 controls the antenna 207 and transmits and receives wireless signals for wireless communication generated by the control unit 202.

Note that if the communication apparatus 104 supports the NFC standard, the Bluetooth standard, or the like, in addition to the IEEE802.11be standard, the communication apparatus 104 may also control wireless communication conforming to these communication standards. If the communication apparatus 104 can execute wireless communication conforming to a plurality of communication standards, a configuration may be employed in which communication units 206 and antennas 207 that support the respective communication standards are separately provide. The communication apparatus 104 communicates data, such as image data, document data, and video data, with the communication apparatuses 107 and 108 via the communication unit 206.

In the wireless network in FIG. 1, the control unit 202 of the communication apparatus 104, which has the role of the master AP, transmits a trigger frame from the communication unit 206 in order to control the communication apparatuses 105 and 106, which have the role of slave APs. When receiving response signals from the communication apparatuses 105 and 106 that are the slave APs, the control unit 202 of the communication apparatus 104 can interpret the received response signals. Meanwhile, in the communication apparatuses 105 and 106, the trigger frame transmitted from the communication apparatus 104 is received by the communication unit 206 and interpreted by the control unit 202. The control units 202 of the communication apparatuses 105 and 106 can transmit a response to the trigger frame from the communication unit 206.

Figure 3:
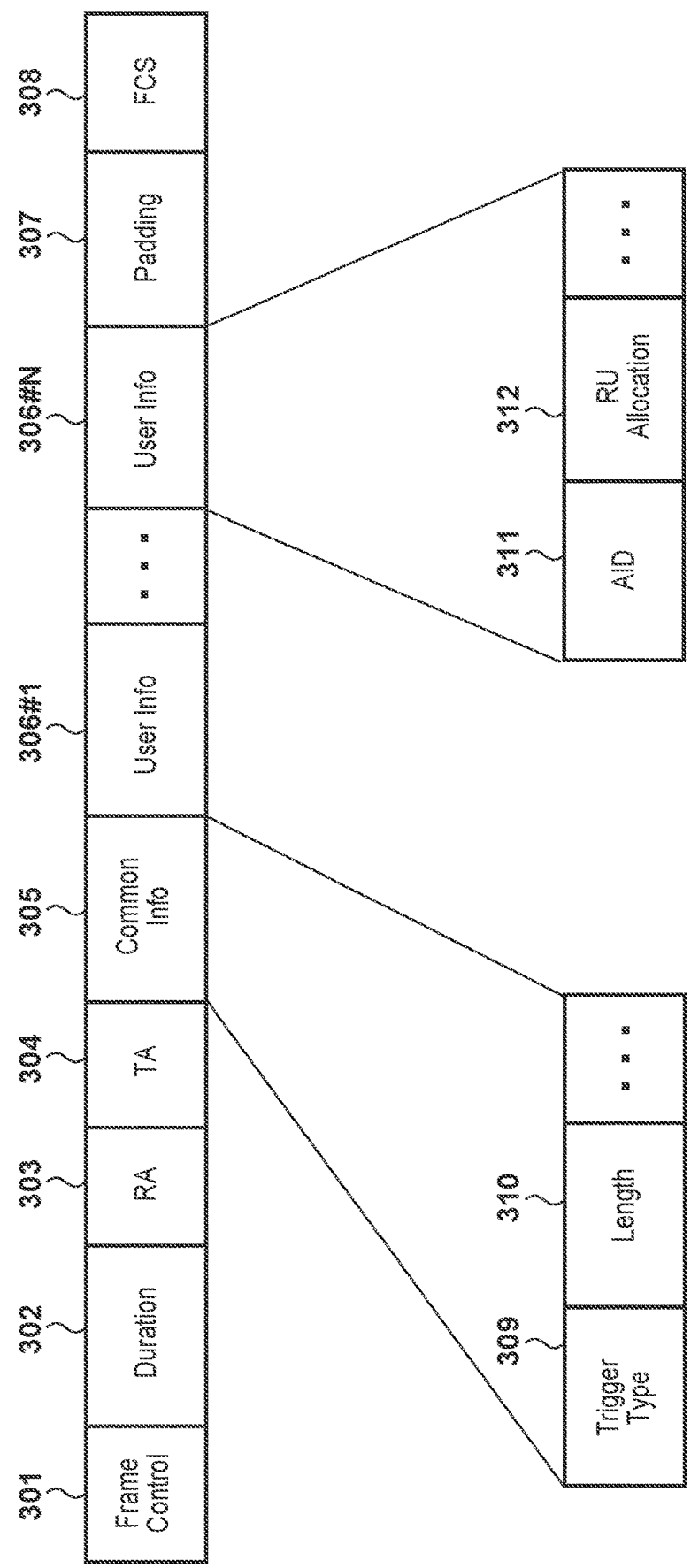
FIG. 3 is a diagram showing a format of a trigger frame used in the embodiment.

FIG. 3 shows a format of the trigger frame for giving a cooperative transmission instruction that the communication apparatus 104, which is the master AP in the present embodiment, transmits to the communication apparatuses 105 and 106, which are the slave APs. This trigger frame is transmitted from the master AP to the slave APs before data transmission (cooperative transmission) to the STAs (the communication apparatuses 107 and 108) is executed by means of a cooperation operation of the plurality of APs. In FIG. 3, fields and subfields denoted by 301 to 312 conform to the format specified in the IEEE802.11ax. That is to say, the trigger frame includes, from the top, a Frame Control field 301, a Duration field 302, an RA field 303, a TA field 304, a Common Info field 305, User Info fields 306, a Padding field 307, and an FCS field 308. A four-bit Trigger Type subfield 309 in the Common Info field 305 designates the type of trigger of this trigger frame. For a normal trigger frame, the Trigger Type subfield 309 indicates 0. A Length subfield 310 in the Common Info field 305 indicates a communication period common to all the STAs. This communication period corresponds to the amount of data that each STA can transmit and receive. If the Trigger Type subfield 309 is 0, the User Info field 306 is added. Table 1 shows, as an example, the correspondence between the Trigger type subfield value and the type of trigger.

TABLE 1

| SUBFIELD VALUE | TRIGGER TYPE |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Joint Transmission Trigger Frame |

In the present embodiment, the trigger frame is dealt with as an AP cooperative transmission trigger frame when the Trigger type subfield value is 8. That is to say, the communication apparatus 104, which is the master AP, generates a trigger frame that includes a Trigger type subfield value (=8) indicating an instruction to perform cooperative transmission with the access points. The User Info fields 306 are fields corresponding to respective slave APs, and the same number of User Info fields 306 as the number of slave APs are concatenated and transmitted. An AID (association ID) 311 is present in each User Info field 306, and each slave AP interprets the content of a User Info field that matches an AID that is given in advance to the slave AP when authentication is performed with the master AP. An RU Allocation subfield 312 in each User Info field 306 specifies an RU (resource unit) and tone size of the corresponding AP.

Figure 4:
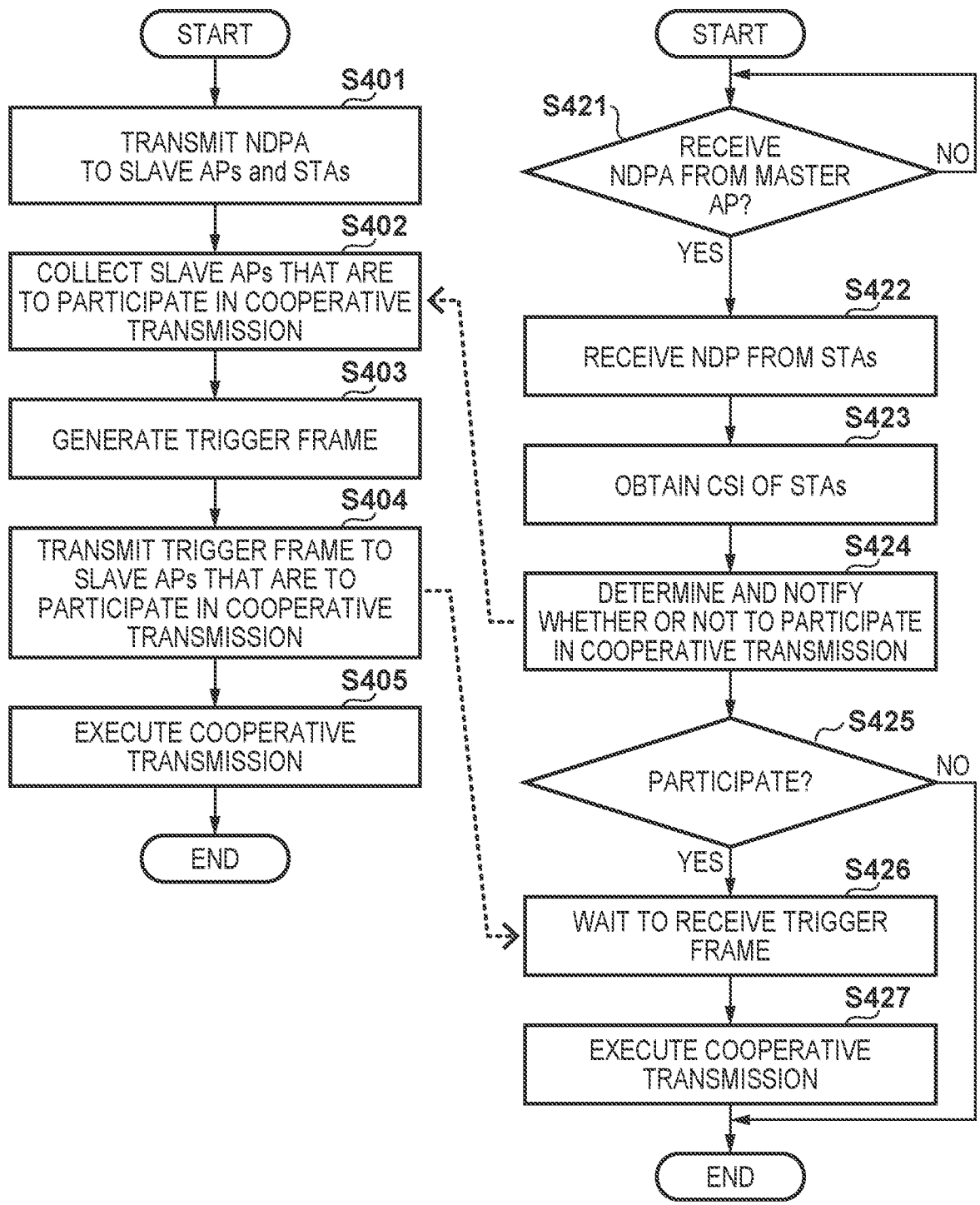
FIG. 4 is a flowchart showing operations performed until an AP cooperatively transmits data to STAs.

FIG. 4 is a flowchart showing processing performed by the master AP and the slave APs until cooperative transmission from the AP to the STAs according to the present embodiment is started. FIG. 5 is a sequence diagram showing an example operation performed until cooperative transmission is executed in the wireless communication system of the present embodiment. In the following description, the communication apparatus 104 is referred to a master AP, the communication apparatuses 105 and 106 are referred to as slave APs, and the communication apparatuses 107 and 108 are referred to as STAs. Each step in the processing performed by the master AP and the slave APs shown in the flowchart in FIG. 4 is executed by the control unit 202 of the respective communication apparatuses.

The master AP transmits NDPA (null data packet announcement) to one or more slave APs and one or more STAs that are connected to the master AP (S401, 501). Upon receiving NDPA, each of the plurality of STAs transmits NDP (null data packet) to the slave APs (502). Upon receiving NDPA from the master AP (S421), each slave AP waits for NDP from the STAs, and receives it (S422). The slave AP obtains channel state Information (CSI) based on NDP received from the STAs (S423). The slave AP then determines whether or not to participate in cooperative transmission based on CSI obtained for the respective STAs (S424, 503a, 503b), and notifies the master AP of the determination results (S424, 504a, 504b). For example, the slave AP may determine to participate in cooperative transmission if the average value of the obtained CSI is large than or equal to a predetermined value. Alternatively, the slave AP may make it a condition for participation in the cooperative transmission that all the obtained CSI values are larger than or equal to a predetermined value.

The master AP collects slave APs that are to participate in cooperative transmission by receiving the notifications as to whether or not to participate in cooperative transmission from the one or more slave APs (S402, 505). The master AP generates a trigger frame (FIG. 3) for cooperative transmission in which the slave APs that are to participate in cooperative transmission are described as User Info (S403, 506). The Trigger type subfield in this trigger frame is 8, as mentioned above. The master AP transmits the generated trigger frame to the slave APs that are to participate in cooperative transmission (S404, 507). Thereafter, cooperative transmission to the STAs is executed together with the slave APs to which the trigger frame has been transmitted (S405, 508).

If each slave AP determines to participate in cooperative transmission and notifies the master AP that the slave AP is to participate in cooperative transmission in step S424 (504a, YES in S425), the slave AP waits to receive the trigger frame from the master AP (S426). Upon receiving the trigger frame, the slave AP interprets information contained in the trigger frame and performs cooperative transmission to the STAs (S426, 508). On the other hand, if, in step S424, the slave AP determines not to participate in cooperative transmission and notifies the master AP that the slave AP is not to participate in cooperative transmission (504b, NO in S425), the processing ends.

As described above, according to the present embodiment, the master AP can collect information regarding the slave APs that are to participate in cooperative transmission, generate the trigger frame, and transmit the trigger frame to the slave APs that are to participate in cooperative transmission. Appropriate coordinated transmission can be realized under the management of the master AP. Note that the names of the fields, the positions of the bits and the number of bits used in the present embodiment are not limited to those described in the present embodiment, and the same information may be stored with different field names, at different positions, or with a different number of bits.

Although the embodiment has been described above, the present invention can be implemented in modes such as a system, an apparatus, a method, a program, or a recording medium (storage medium), for example. Specifically, the present invention may be applied to a system that is constituted by a plurality of devices (e.g., a host computer, an interface device, an image capture apparatus, a web application etc.), or may be applied to an apparatus constituted by a single device.

According to the above-described embodiments, a master access point can notify slave access points of information regarding cooperative transmission using a trigger frame.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that operates as a master access point in a wireless network that includes one or more other access points operating as slaves and one or more stations, the apparatus comprising:
   a generating unit configured to generate a trigger frame that includes a Trigger type subfield value indicating an instruction to perform coordinated transmission with the other access points;
   a transmitting unit configured to transmit the trigger frame to the other access points; and
   an executing unit configured to execute the coordinated transmission with the other access points to which the trigger frame has been transmitted.

2. The communication apparatus according to claim 1, wherein
   the transmitting unit transmits the trigger frame to an access point that has notified that the access point is to participate in the coordinated transmission, out of the one or more other access points.

3. The communication apparatus according to claim 1, wherein
   the trigger frame includes a description indicating a resource to be assigned to an access point that has notified that the access point is to participate in the coordinated transmission, out of the one or more other access points.

4. The communication apparatus according to claim 2, wherein
   after transmitting NDPA (null data packet announcement) to the stations connected to the communication apparatus and the other access points, the communication apparatus receives a notification as to whether or not to participate in coordinated transmission from each of the one or more other access points.

5. The communication apparatus according to claim 1, wherein
   the trigger frame has a format conforming to a trigger frame specified by IEEE802.11ax, and a Common Info field has a value indicating the coordinated transmission.

6. The communication apparatus according to claim 5, wherein
   the Common Info field includes a four-bit Trigger type subfield, and a value of the Trigger type subfield indicates the coordinated transmission.

7. The communication apparatus according to claim 5, wherein
   a User Info field of the trigger frame includes a description regarding a resource to be assigned to an access point that has notified that the access point is to participate in the coordinated transmission.

8. A wireless communication system in which a plurality of access points and one or more stations constitute a wireless network, wherein one access point out of the plurality of access points operates as a master, and another access point out of the plurality of access points operates as a slave, the system comprising:
   a generating unit configured to generate a trigger frame that includes a Trigger type subfield value indicating an instruction to perform coordinated transmission with the other access point;
   a transmitting unit configured to transmit the trigger frame from the access point operating as the master to the access point operating as the slave; and
   an executing unit configured to cause the access point operating as the master and the access point operating as the slave that has received the trigger frame to execute the coordinated transmission to the one or more stations.

9. An access point controlling method for controlling an access point that operates as a master and constitutes a wireless network that includes one or more other access points operating as slaves and one or more stations, the method comprising:
   generating a trigger frame that includes a Trigger type subfield value indicating an instruction to perform coordinated transmission with the other access points;
   transmitting the trigger frame to the other access points; and
   executing the cooperative transmission with the other access points to which the trigger frame has been transmitted.

10. A non-transitory computer-readable storage medium storing a program for causing a computer to perform an access point controlling method for controlling an access point that operates as a master and constitutes a wireless network that includes one or more other access points operating as slaves and one or more stations, the method comprising:
   generating a trigger frame that includes a Trigger type subfield value indicating an instruction to perform coordinated transmission with the other access points;
   transmitting the trigger frame to the other access points; and
   executing the coordinated transmission with the other access points to which the trigger frame has been transmitted.

11. A communication apparatus that operates as a slave access point in a wireless network that includes another access point operating as a master and one or more stations, the apparatus comprising:
   a receiving unit configured to receive a trigger frame that includes a Trigger type subfield value indicating an instruction to perform coordinated transmission with the other access point operating as the master, from the other access point; and
   an executing unit configured to execute coordinated transmission to the one or more stations with the other access point, based on the received trigger frame.

12. The communication apparatus according to claim 11, wherein
the trigger frame has a format conforming to a trigger frame specified by IEEE802.11ax, and a Common Info field has a value indicating the coordinated transmission.

13. The communication apparatus according to claim 11, further comprising:
an obtaining unit configured to obtain channel state information between the communication apparatus and the one or more stations;
a determining unit configured to determine whether or not to participate in coordinated transmission based on a channel state obtained by the obtaining unit; and
a transmitting unit configured to transmitting a result of the determination performed by the determining unit to the other access point operating as the master.

14. The communication apparatus according to claim 13, wherein
the obtaining unit obtains the channel state information based on NDP received from the one or more stations after receiving NDPA from the other access point operating as the master.

15. An access point control method for controlling an access point that operates as a slave and constitutes a wireless network that includes another access point operating as a master and one or more stations, the method comprising:
receiving a trigger frame that includes a Trigger type subfield value indicating an instruction to perform coordinated transmission with the other access point operating as the master, from the other access point; and
executing coordinated transmission to the one or more stations with the other access point, based on the received trigger frame.

16. A non-transitory computer-readable storage medium storing a program for causing a computer to perform an access point control method for controlling an access point that operates as a slave and constitutes a wireless network that includes another access point operating as a master and one or more stations, the method comprising:
receiving a trigger frame that includes a Trigger type subfield value indicating an instruction to perform coordinated transmission with the other access point operating as the master, from the other access point; and
executing coordinated transmission to the one or more stations with the other access point, based on the received trigger frame.

\* \* \* \* \*